United States Patent
Lengemann et al.

(10) Patent No.: US 12,397,590 B2
(45) Date of Patent: Aug. 26, 2025

(54) PNEUMATIC TYRE FOR A TWO-WHEELED VEHICLE

(71) Applicant: Continental Reifen Deutschland GmbH, Hannover (DE)

(72) Inventors: Daniel Lengemann, Korbach (DE); Andre Schmidt, Medebach (DE); Jan-Niklas Voss, Titz (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/546,354

(22) PCT Filed: Dec. 3, 2021

(86) PCT No.: PCT/DE2021/200239
§ 371 (c)(1),
(2) Date: Aug. 14, 2023

(87) PCT Pub. No.: WO2022/171226
PCT Pub. Date: Aug. 18, 2022

(65) Prior Publication Data
US 2024/0116316 A1    Apr. 11, 2024

(30) Foreign Application Priority Data

Feb. 12, 2021  (DE) ..................... 10 2021 201 322.8

(51) Int. Cl.
*B60C 15/00*    (2006.01)

(52) U.S. Cl.
CPC ...... *B60C 15/0045* (2013.01); *B60C 2200/10* (2013.01); *B60C 2200/12* (2013.01)

(58) Field of Classification Search
CPC ............ B60C 15/0036; B60C 15/0045; B60C 2200/10; B60C 2200/12
See application file for complete search history.

(56) References Cited

U.S. PATENT DOCUMENTS

| | | |
|---|---|---|
| 2017/0136819 A1 | 5/2017 | Wurmback |
| 2018/0304690 A1 | 10/2018 | Misani et al. |
| 2021/0188005 A1 | 6/2021 | Erbizzoni et al. |

FOREIGN PATENT DOCUMENTS

| | | |
|---|---|---|
| DE | 202015000366 U1 | 4/2016 |
| DE | 202020104281 U1 | 8/2020 |

(Continued)

OTHER PUBLICATIONS

European Examination Report dated Jun. 26, 2024 for the counterpart European Patent Application No. 21 823 759.3 and machine translation of same.

(Continued)

*Primary Examiner* — Cedrick S Williams
(74) *Attorney, Agent, or Firm* — Richard A. Wolf; Gregory Adams

(57) ABSTRACT

A two-wheeled vehicle pneumatic tire having a tread, a tire carcass, tire sidewalls, and two bead regions with a bead protective strip. The tire carcass is formed from a first carcass inlay and a second carcass inlay. The second carcass inlay is arranged radially inwardly of the first carcass inlay, and extends from a crown region (17) of the two-wheeled vehicle pneumatic tire and terminates at a second carcass inlay end under the bead protective strip. The two-wheeled vehicle pneumatic tire provides improved puncture protection whilst maintaining good rolling resistance. This is achieved in that the first carcass inlay is guided with a first carcass inlay turn-up over the particular tire sidewall as far as under the tread to a first carcass inlay end, and terminates there at the first carcass inlay end.

9 Claims, 2 Drawing Sheets

(56) References Cited

FOREIGN PATENT DOCUMENTS

Figure 3:
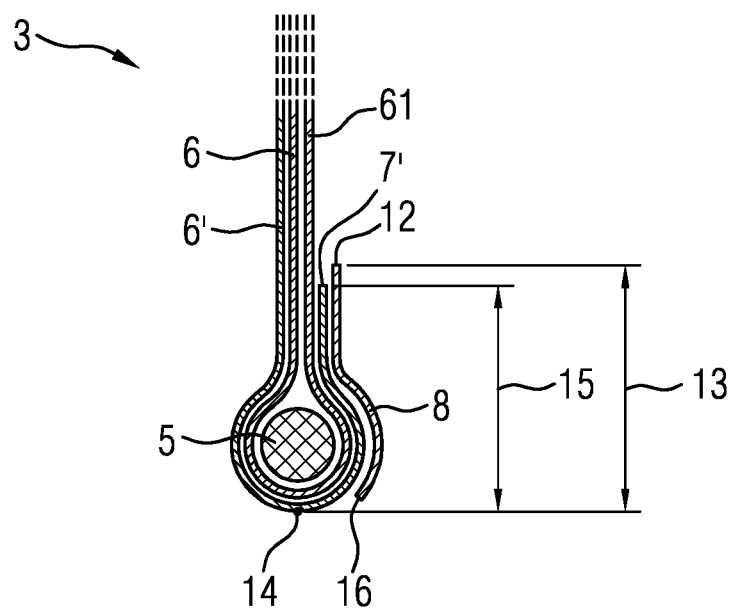

| | | | |
|---|---|---|---|
| EP | 0484831 A1 | 5/1992 | |
| EP | 3045324 A1 * | 7/2016 | ......... B60C 15/0045 |
| EP | 3174738 A1 | 6/2017 | |
| JP | 3023128 B2 * | 3/2000 | |
| WO | 2017072708 A1 | 5/2017 | |
| WO | 2019224714 A1 | 11/2019 | |

OTHER PUBLICATIONS

International Search Report dated Feb. 18, 2022 of International Application PCT/DE2021/200239 on which this application is based.

* cited by examiner

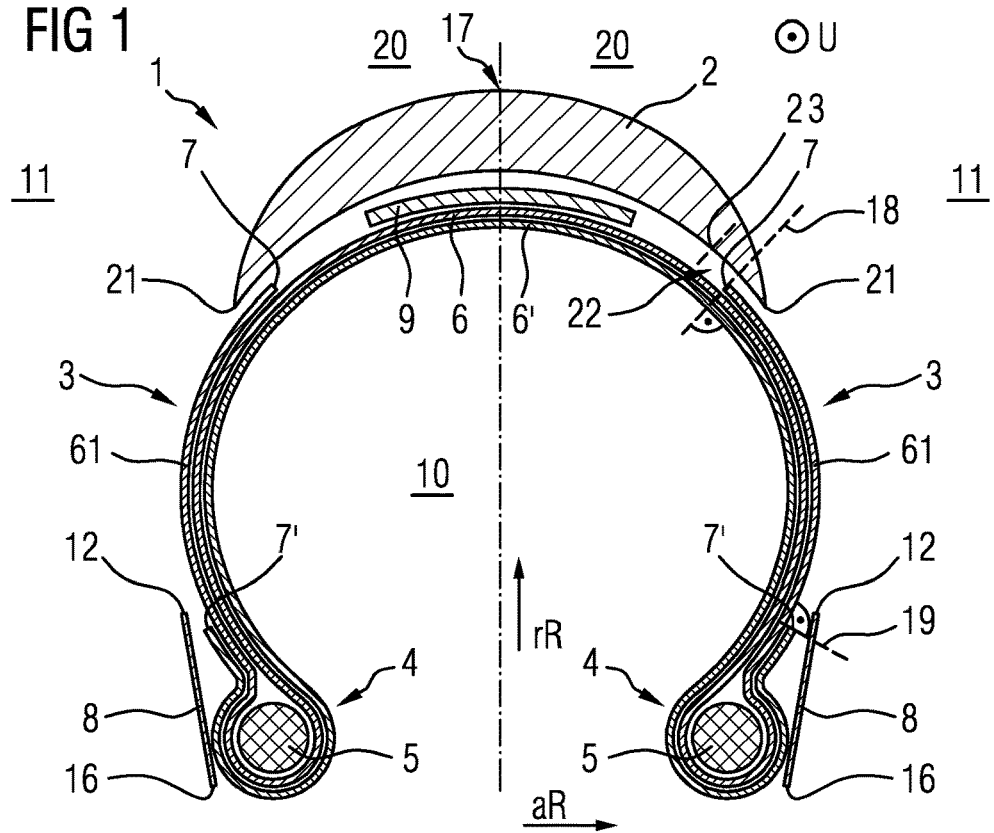
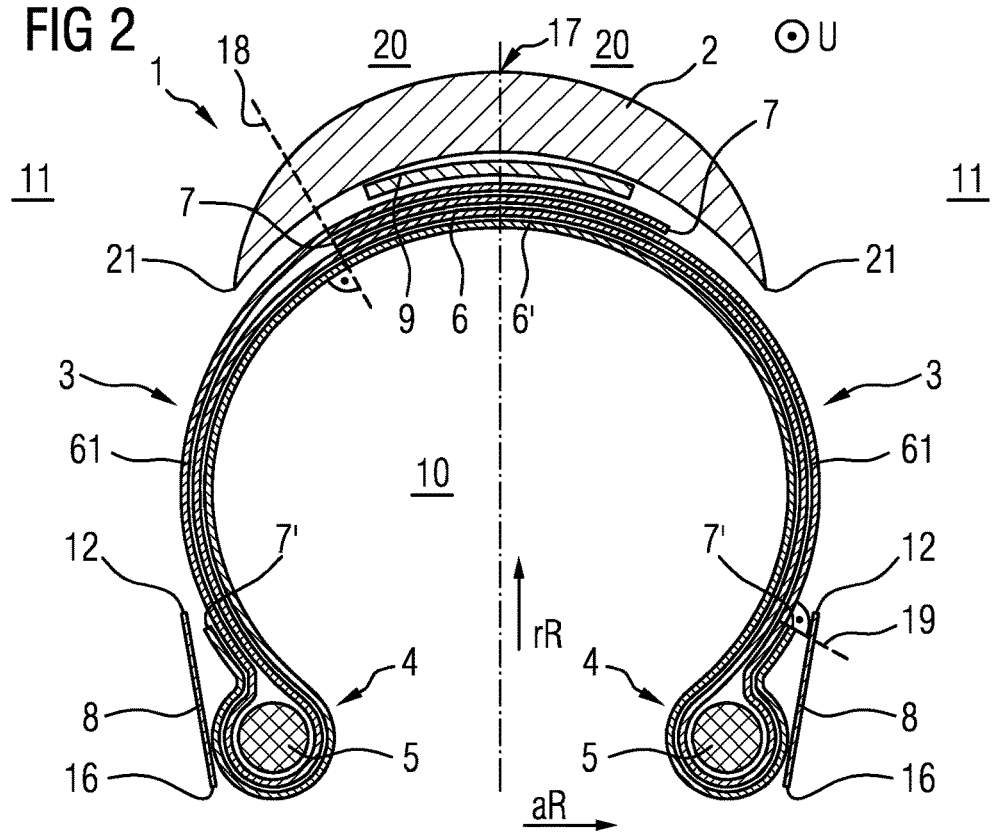

PNEUMATIC TYRE FOR A TWO-WHEELED VEHICLE

The invention relates to a two-wheeled vehicle pneumatic tire, preferably a bicycle tire, particularly preferably a racing bike tire, having a tread, having a tire carcass, having tire sidewalls and having two bead regions which each have a tire bead with a core, wherein the two bead regions each have, as an anti-chafing guard, a bead protective strip arranged axially outside the carcass, wherein the tire carcass is formed from a first carcass inlay and a second carcass inlay, each comprising strength members, wherein the second carcass inlay is arranged, radially to the inside of the first carcass inlay, in a crown of the two-wheeled vehicle pneumatic tire, extends from the crown of the two-wheeled vehicle pneumatic tire over the tire sidewalls into the two bead regions, loops there around the particular core from axially inside to axially outside, and terminates at a second carcass inlay end under the bead protective strip of the particular bead region, and wherein the first carcass inlay extends from the crown of the two-wheeled vehicle pneumatic tire over the tire sidewalls into the bead regions, and loops there around the particular core from axially inside to axially outside.

Conventional two-wheeled vehicle pneumatic tires, preferably bicycle tires, particularly preferably racing bike tires, are designed and optimized in terms of rolling resistance, puncture protection, and mileage. There is, to some extent, a conflict of aims between these characteristics.

For example, EP 3174738 A1 discloses a racing bike tire having a two-ply carcass, wherein turn-ups of both carcass plies largely cover the sidewalls. Such a tire is reinforced, at least in a part of the sidewall, by four ply thicknesses of the carcass. The construction affords the sidewall a high degree of protection against cutting. However, the extensive use of carcass material in the region of the sidewall has an adverse effect on weight and rolling resistance.

A typical construction with a single-ply carcass is distinguished by the fact that the turn-ups of the carcass inlay extend as far as into the tire crown and terminate, overlapping one another, under the tread. Such a construction is easy to produce but exhibits lower cutting resistance in the sidewall and thus exhibits lower puncture resistance in the sidewall.

DE 202020104281 U1 discloses a tire having a two-ply carcass, wherein the carcass turn-ups of both carcass plies terminate under the bead protective strip. Such a tire is optimized with regard to rolling resistance but exhibits low puncture protection.

It is the object of the invention to provide a two-wheeled vehicle pneumatic tire, preferably a bicycle tire, particularly preferably a racing bike tire, in the case of which puncture protection is improved whilst maintaining good rolling resistance.

The object is achieved in that, proceeding from the particular bead region, the first carcass inlay is guided with a first carcass inlay turn-up over the particular tire sidewall as far as under the tread to a first carcass inlay end, and terminates there at the first carcass inlay end.

One advantage of the two-wheeled vehicle pneumatic tire according to the invention, preferably the bicycle tire, particularly preferably the racing bike tire, can be seen in particular in the fact that the new tire construction significantly improves puncture resistance. At the same time, the tire has good rolling resistance.

It is essential to the invention that, proceeding from the particular bead region, the first carcass inlay is guided with a first carcass inlay turn-up over the particular tire sidewall as far as under the tread to a first carcass inlay end, and terminates there at the particular first carcass inlay end under the tread. At the same time, the second carcass inlay terminates at its second carcass inlay ends under the bead protective strip, and is thus not guided, proceeding from the particular bead region, over the tire sidewalls as far as under the tread.

The tire has two axial halves. Thus, in both axial halves of the tire, in one region of the sidewall, in particular radially between the second carcass inlay end and a tread end of the tread, the sidewall is reinforced by three ply thicknesses of the carcass, wherein the first carcass inlay contributes two ply thicknesses and the second carcass inlay contributes one ply thickness. The reinforcement by three ply thicknesses has the effect of considerably improving the cutting resistance of the sidewall in relation to a carcass in which the sidewall is reinforced by only two ply thicknesses.

The reinforcement of the sidewall by three ply thicknesses of the carcass duly leads to increased friction losses and additional use of carcass material. However, the conflict of aims between puncture resistance of the sidewall and rolling resistance is resolved to a high degree, in favor of puncture resistance.

The rolling resistance and the riding characteristics of such a tire according to the invention are in particular better than in the case of a tire in which the sidewall is reinforced by four ply thicknesses of the carcass, whilst maintaining good puncture resistance.

Owing to the fact that the first carcass inlay ends are arranged under the tread, these are at the same time protected against detachment. This further improves the durability and puncture resistance of the two-wheeled vehicle tire.

Owing to the two carcass inlays being looped around the core, the new construction makes it possible both to maintain a simple tire structure and to advantageously protect the core against damage, in particular in relation to a carcass that has only one carcass inlay.

It has thus been found that a two-wheeled vehicle tire, preferably a bicycle tire, particularly preferably a racing bike tire, having the new construction resolves the conflict of aims between puncture resistance, in particular puncture resistance of the sidewall, and rolling resistance to a high degree, in favor of puncture resistance.

At the same time, owing to the fact that the second carcass inlay ends are arranged under the particular bead protective strip, the new construction furthermore makes it possible to eliminate any direct connection between a tire interior and a tire exterior through one of the two carcass inlays. Likewise, with the second carcass inlay ends, the strength members of the second carcass inlay that terminate there are covered from the outside by the bead protective strip. This avoids or greatly reduces an escape of air from the tire interior through the two carcass inlays, in particular during tube-free operation, as a result of which a high degree of air-tightness of the tire, in particular during tube-free operation, is furthermore made possible.

The first carcass inlay terminates at the first carcass inlay ends under the tread. The first carcass inlay ends can thus be arranged spatially between the tread and the second carcass inlay, and radially to the outside and axially to the inside of tread ends of the tread. A first straight line oriented perpendicular to the second carcass inlay can connect the tread and the first carcass inlay end.

The second carcass inlay terminates at the second carcass inlay ends under the bead strip of the particular bead region.

The second carcass inlay ends may thus each be arranged, spatially between the particular bead protective strip and the particular first carcass inlay turn-up, in the bead region. A second straight line oriented perpendicular to the first carcass inlay turn-up can connect the bead protective strip and the second carcass inlay end.

The bead protective strip serves, in the conventional manner, as an anti-chafing guard in relation to a rim flange during the operation of the tire, and thus prevents the carcass strength members from being exposed. The bead protective strip may be involved in forming or may form an outer surface of the bead region, said outer surface being designed as a contact surface with respect to the rim. The bead protective strip may cover the particular second carcass inlay end from axially outside.

The first carcass inlay and the second carcass inlay each have, in the conventional manner, strength members which run parallel to one another and which are embedded in elastomer material. Here, the strength members may, in the conventional manner, enclose an angle of 40 degrees to 60 degrees with the direction of rotation U. The strength members of the first carcass inlay and of the second carcass inlay may have opposing angles of inclination.

Advantageous developments of the invention will be explained below.

The tire has two axial halves. In one advantageous embodiment of the invention, each first carcass inlay end is arranged under the tread in each case in that axial half of the tire in which the first carcass inlay is guided with the first carcass inlay turn-up over the tire sidewall as far as under the tread to the particular first carcass inlay end.

The two first carcass inlay turn-ups therefore do not overlap in the crown of the tire. The first carcass inlay ends are arranged in each case in the same axial half as the first carcass inlay turn-up that terminates at the particular first carcass inlay end. The first carcass inlay turn-ups are thus arranged so as to be limited to the particular axial half of the tire. Therefore, axially between the two first carcass inlay ends of the first carcass inlay, reinforcement is provided by exactly two ply thicknesses of the carcass.

Therefore, a two-wheeled vehicle pneumatic tire is provided which, with little use of carcass material, in particular in the crown of the tire, ensures advantageous puncture protection of the sidewalls. Such a tire exhibits particularly low rolling resistance.

In particular, each first carcass inlay end is arranged, under a tread runout of the tread, in each case in that axial half of the tire in which the first carcass inlay is guided with the first carcass inlay turn-up over the tire sidewall as far as under the tread to the particular first carcass inlay end and terminates at the first carcass inlay end that is arranged under the tread runout.

This further optimizes the rolling resistance owing to further reduced use of mutually overlapping carcass material. At the same time, the cutting resistance in the region of the sidewalls is furthermore ensured, and it is made possible for the first carcass inlay ends to be protected against detachment.

The first carcass inlay then terminates at the first carcass inlay ends under the tread runout. The first carcass inlay ends can thus each be arranged spatially between the tread runout and the second carcass inlay, and radially to the outside and axially to the inside of the tread ends of the tread. A first straight line oriented perpendicular to the second carcass inlay can connect the tread runout and the first carcass inlay end.

In each axial half of the tire, the tread runout may, proceeding from the particular tread end, extend axially inward by at most 10 mm, preferably at most 2 mm, as measured along a radially inner boundary of the tread.

In an alternative advantageous refinement of the invention, the two first carcass inlay turn-ups are arranged so as to overlap one another in the crown of the tire.

Each of the two first carcass inlay turn-ups extends from a bead region in one axial half of the tire as far as under the tread and terminates, in the other axial half of the tire in each case, at the particular first carcass inlay end. Thus, in the crown of the tire, the tire is reinforced by four ply thicknesses of the carcass, wherein the first carcass inlay contributes three ply thicknesses and the second carcass inlay contributes one ply thickness.

Although such a construction can have an adverse effect on rolling resistance, the cutting resistance of the tire in the region of the tread is greatly improved, whereby the tire exhibits further improved puncture resistance. This is of importance in particular for all-season tires and for training tires for racing bikes.

In one advantageous development of the invention, the bead protective strip terminates at a radially outer end at a first height of at most 15 mm, preferably of 10 mm to 12 mm, as measured relative to an outermost turning point of the strength members of the second carcass inlay that are looped around the core.

Owing to this low arrangement of the bead protective strip and the associated low arrangement of the second carcass inlay ends, the turn-ups of the second carcass inlays are primarily arranged in a region which experiences little or no cyclic deformation during the operation of the tire. Thus, the friction-induced energy losses of the second carcass inlay can be further reduced. Likewise, the use of material for the bead protective strip and for the second carcass inlay, and thus the weight of the tire, are advantageously reduced.

To determine a height in the bead region, in particular the first height or the second height mentioned below, the two-wheeled vehicle pneumatic tire can, as viewed in cross section, be bent up such that the two carcass inlays extending from the crown are arranged substantially rectilinearly in the region of the sidewall and transition into a loop around the core that is substantially symmetrical with respect to the core. In this arrangement, the particular height as measured relative to the outermost turning point of an outer edge of the strength members of the second carcass inlay that are looped around the core is measured parallel to the substantially rectilinearly arranged carcass inlays. If the bead protective strip has fibers, in particular a fabric, then the fibers, in particular the fabric edge of the fabric, can predetermine the radially outer end of the bead protective strip.

Correspondingly, the first carcass inlay end and the second carcass inlay end may be formed by ends of the strength members, in particular by a fabric edge, of the particular carcass inlay.

Corresponding advantages can be achieved with regard to the second carcass inlay if the second carcass inlay ends are arranged, under the bead protective strip, at a second height of at most 13 mm, preferably of 8 mm to 10 mm, as measured relative to an outermost turning point of the strength members of the second carcass inlay that are looped around the core.

Corresponding advantages are also achieved if the second carcass inlay ends terminate in the particular bead region, in particular before the sidewall proceeding from the core.

The bead protective strip may be designed as a rubberized band having fibers, in particular as a rubberized fabric band. The fabric band may be a nettle fabric or a nylon fabric.

In a further advantageous development of the invention, the bead protective strip is free from threads which have intertwined fibers and which connect a radially outer end of the bead protective strip and an inner end of the bead protective strip.

In a further advantageous development of the invention, the bead protective strip is designed as a rubberized monofilament fabric.

The rubberized monofilament fabric is particularly effective in reducing air leakage at the tire/rim contact region, in particular more effective than a conventional bead protective strip having a fabric comprising threads composed of a plurality of intertwined fibers. A reason for this is that the monofilaments are embedded substantially individually in the rubber coating, and an escape of air from the tire interior to the tire exterior via microchannels between the fibers of the threads of the bead protective strip is thus substantially avoided.

This enables the tire mounted on a rim to be particularly air-tight. This is advantageous in particular for a tube-free tire. Operation of the tire without a tube can therefore be made possible without further complex measures that often worsen the rolling resistance, such as an inner liner.

Here, the bead protective strip designed as a rubberized monofilament fabric can be free from threads which have intertwined fibers and which connect a radially outer end of the bead protective strip and an inner end of the bead protective strip.

In a further advantageous development of the invention, the carcass is in direct contact with a tire interior. This makes it possible to obtain a particularly lightweight tire and thus advantageous rolling resistance. For a tube-free tire, in particular a "tubeless ready" bicycle tire, sufficient air-tightness can be ensured by the measures described, in particular the design of a bead protective strip designed as a rubberized monofilament fabric.

In a further advantageous development of the invention, the tire is a tube-free tire, in particular a "tubeless" tire or a "tubeless ready" tire.

Tube-free tires are tires that are suitable for tube-free operation of the tire. Tube-free tires are in particular tires in tube-free operation. Tube-free tires place increased demands on the air-tightness both of the tire itself and of the seal at the tire/rim contact region. A system in tube-free operation thus comprises at least the tube-free tire and a rim, wherein the tube-free tire is installed on the rim and the system does not have any tube. In tube-free operation of the tube-free tire, there are no friction losses between tube and tire, and therefore the tire allows advantageous rolling resistance. Tube-based reasons for punctures are also eliminated. When operating a tube-free tire in tube-free operation, the use of a sealing liquid, in particular a milk sealant, which is introduced into the tire interior between the tire and the rim, can improve the tightness.

A tube-free tire may be a so-called "tubeless" tire, which is primarily or exclusively suitable and intended for operation without a tube. A tubeless tire can often also be used without milk sealant.

The tube-free tire may also be a so-called "tubeless ready" tire, which is suitable and intended both for operation with and for operation without a tube. As a rule, a tubeless ready tire is used with a sealing liquid, in particular a milk sealant, in tube-free operation. The tire and rim may be designed here so as to seal directly against one another.

The invention is particularly advantageous for tube-free bicycle tires, in particular tube-free racing bike tires or tube-free mountain bike tires.

In a further advantageous development of the invention, it is provided that the tire is a bicycle tire suitable and intended for operation with a tube, in particular a clincher tire. A system operated with a tube thus comprises at least the bicycle tire and a rim, wherein the bicycle tire is installed on the rim, and a substantially air-tight tube is arranged in a tire interior that is enclosed by the tire and the rim. When a tire is operated with a tube, the air pressure is maintained by means of a substantially air-tight tube arranged in the tire interior between tire and rim. Here, too, the novel tire construction permits an advantageously reduced rolling resistance.

A so-called clincher tire is usually a wired tire or a folding tire. The tire then has a wire core or a folding core and is mounted with the bead on the rim flange of the rim. A clincher tire can be installed and uninstalled using simple means. In the event of a puncture, the damage can thus be easily repaired.

In a further advantageous development of the invention, at least in one region of the sidewall, the two carcass inlays, that is to say the first carcass inlay and the second carcass inlay, are the only inlays comprising strength members. By dispensing with a further inlay which has strength members, a particularly thin and therefore lightweight region of the sidewall, with optimized rolling resistance, is made possible.

In a further advantageous development of the invention, a damping rubber inlay composed of a highly elastic rubber is arranged between the tread and the tire carcass, wherein the damping rubber inlay in particular has a material thickness of between 0.2 mm and 1 mm.

Greater ride comfort and better rolling resistance are thereby made possible by decoupling the fabric plies. The ride comfort of the bicycle tire is significantly improved owing to the special material thickness of the damping rubber inlay, since the bicycle tire overall is better able to adapt to the roadway surface. Furthermore, the additional rubber inlay enhances the puncture protection in the crown.

The damping rubber inlay may preferably be composed of a highly elastic rubber having a material rebound value between 70 and 80. Optimum ride comfort is achieved with this material rebound value, wherein the rolling resistance of the tire is not simultaneously increased.

In a further advantageous development of the invention, a protective ply composed of an in particular tear-resistant rubberized fabric, preferably an in particular tear-resistant rubberized fabric comprising fibers composed of polyethylene terephthalate polyacrylate, or composed of a rubber layer, is arranged between the tread and the tire carcass.

The protective ply ensures optimum puncture protection at the crown for the two-wheeled vehicle pneumatic tire, preferably the bicycle tire, particularly preferably the racing bike tire. The in particular tear-resistant rubberized fabric having fibers composed of polyethylene terephthalate polyacrylate may be a rubberized fabric that has or is composed of Vectran fibers. The rubber layer may have a thickness of at most 6 mm as measured in a radial direction at the tire crown.

In a further advantageous development of the invention, the tire is a bicycle tire, in particular a racing bike tire, a mountain bike tire or a tire for a bicycle having an electric motor for driving the bicycle. The novel tire construction is however suitable for use in all bicycle segments.

The novel tire construction can be particularly advantageously used in racing bike tires, since the rolling resistance is significantly reduced. A racing bike tire usually has a maximum tire width of 35 mm and exhibits a racing bike-specific low profiling of the tread.

The novel tire construction, especially for tubeless tires, is also ideally suited to mountain bike tires. Mountain bike tires usually have a minimum tire width of 35 mm, in particular 40 mm, and often have a pronounced profiling of the tread. Aspects such as the rolling resistance are also becoming increasingly important for mountain bike tires. In particular, tube-free operation of the tire may be advantageous, because then the susceptibility to punctures is reduced and such a tire can be used at a comparatively lower air pressure.

The novel tire construction is also ideally suited for use on bicycles having an electric motor for driving the bicycle. In such use, a low rolling resistance is advantageous because it increases the range of the bicycle.

The tire may be a tire for an electric bicycle. A tire for an electric bicycle may satisfy the test standard "ECE R75". Specific suitability for an electric bicycle is often indicated by the designation "E-bike ready 50".

The tire may also be a tire for a pedelec, in which the drive is at least partially assisted by the electric motor. Specific suitability for a pedelec is often indicated by the designation "E-bike ready 25".

In a further advantageous development of the invention, the tire is a motorcycle tire, in particular an electric scooter tire. A motorcycle tire or an electric scooter tire having the novel construction can also contribute, by way of the advantageous rolling resistance, to an improved range of the vehicle.

Further features, advantages and details of the invention will now be explained in more detail with reference to the schematic drawings, which represent exemplary embodiments, and comparison data. In the drawings:

FIGS. 1 and 2: show a two-wheeled vehicle pneumatic tire in cross section;

FIG. 3: shows a detail of a two-wheeled vehicle tire in cross section.

FIGS. 1 and 2 each show the main tire components of a two-wheeled vehicle tire 1 in a cross-sectional view. The tire is a two-wheeled vehicle pneumatic tire 1, preferably bicycle tire, particularly preferably racing bike tire 1, having a tread 2, having a tire carcass, having tire sidewalls 3 and having two bead regions 4 which each have a tire bead with a core 5, wherein the two bead regions 4 each have, as an anti-chafing guard, a bead protective strip 8 arranged axially outside the carcass.

The tire carcass is formed from a first carcass inlay 6 and a second carcass inlay 6', each comprising strength members. It is usually the case here that, within the particular carcass inlay, the strength members are arranged parallel to one another and at an angle of 40 degrees to 60 degrees with respect to the direction of rotation U. The strength members of the two carcass inlays 6, 6' may have opposing angles of inclination. The tire 1 has two axial halves 20, which are symmetrical with respect to one another at least with regard to the carcass inlays 6, 6'.

The second carcass inlay 6' is, in a crown 17 of the tire 1, arranged radially within the first carcass inlay 6. Said second carcass inlay extends from the crown 17 of the two-wheeled vehicle pneumatic tire 1 over the tire sidewalls 3 as far as into the two bead regions 4, loops there around the particular core 5 from axially inside to axially outside, and terminates at a second carcass inlay end 7' under the bead protective strip 8 of the particular bead region 4.

The first carcass inlay 6 extends from the crown 17 of the tire 1 over the tire sidewalls into the bead regions 4, and loops there around the particular core from axially inside to axially outside.

The two-wheeled vehicle tire is distinguished by the fact that, proceeding from the particular bead region 4, the first carcass inlay 6 is guided with a first carcass inlay turn-up 61 over the particular tire sidewall 3 as far as under the tread to a first carcass inlay end 7, and terminates there under the tread 2 at the first carcass inlay end 7. Thus, in both axial halves of the tire, in one region of the sidewall 3, in particular radially between the second carcass inlay end 7' and a tread end 21, the sidewall 3 is reinforced by three ply thicknesses of the carcass, wherein the first carcass inlay 6 contributes two ply thicknesses and the second carcass inlay 6' contributes one ply thickness.

The first carcass inlay 6 terminates at the first carcass inlay ends 7 under the tread 2. The first carcass inlay ends 7 can thus each be arranged spatially between the tread 2 and the second carcass inlay 6', and radially to the outside and axially to the inside of the tread ends 21 of the tread. A first straight line 18 oriented perpendicular to the second carcass inlay 6' can connect the tread 2 and the first carcass inlay end 7.

The second carcass inlay 6' terminates at the second carcass inlay ends 7' under the bead protective strip 8 of the particular bead region 4. The second carcass inlay ends 7' may thus each be arranged, spatially between the particular bead protective strip 8 and the particular first carcass inlay turn-up 61, in the bead region 4. A second straight line 19 oriented perpendicular to the first carcass inlay turn-up 61 can connect the bead protective strip 8 and the second carcass inlay end 7'.

The bead protective strip 8 may terminate at a radially outer end 12 at a first height 13 of at most 15 mm, preferably of 10 mm to 12 mm, as measured relative to an outermost turning point 14 of an outer edge of the strength members of the second carcass inlay 6' that are looped around the core 5. Alternatively or in addition, the second carcass inlay ends 7' of the second carcass inlay 6' may be arranged at a second height 15 of at most 13 mm, preferably of 8 mm to 10 mm, as measured relative to an outermost turning point 14 of the strength members of the second carcass inlay 6' that are looped around the core 5. A dimensioning of the first height 13 and of the second height 15 is illustrated in FIG. 3. The bead protective strip 8 is designed as a rubberized strip having fibers, in particular as a rubberized fabric strip.

The fibers, in particular the fabric edge of the fabric, can predetermine the radially outer end 12 of the bead protective strip 8. In particular for tube-free operation, the bead protective strip 8 may be free from threads which have intertwined fibers and which connect a radially outer end 12 of the bead protective strip 8 and an inner end 16 of the bead protective strip 8. In FIGS. 1 and 2, the bead protective strip 8 is designed by way of example as a rubberized monofilament fabric.

The second carcass inlay ends 7' of the second carcass inlay 6' may terminate in the bead region 4, in particular before the sidewall 3 proceeding from the core 5.

The carcass is in direct contact with the tire interior 10. The tire 1 in particular has no inner liner. Advantages according to the invention can however also be achieved by a tire 1 which has a further layer, in particular an inner liner, between tire interior 10 and carcass.

As illustrated, at least in one region of the sidewall 3, in particular adjoining the bead strip 8 radially to the outside, the two carcass inlays 6, 6' may be the only inlays comprising strength members.

As illustrated, a damping rubber inlay 9 composed of a highly elastic rubber may be arranged between the tread 2 and the tire carcass, wherein the damping rubber inlay 9 has in particular a material thickness between 0.2 mm and 1 mm. The damping rubber inlay may preferably be composed of a highly elastic rubber having a material rebound value between 70 and 80.

A protective ply (not illustrated) comprising an in particular tear-resistant rubberized fabric, preferably a rubberized fabric comprising fibers made of polyethylene terephthalate polyacrylate, may be arranged between the tread 2 and the tire carcass. Alternatively, the protective ply may also be formed from a rubber layer with a thickness of at most 6 mm as measured in a radial direction rR at the tire crown 17.

The tire illustrated may in each case be a tube-free tire, in particular a "tubeless" tire or a "tubeless ready" tire. The tire may be suitable, intended and used for tube-free operation. A tire for operation with a tube, in particular a clincher tire, can however also have an advantageous construction with corresponding features.

The tire illustrated is a racing bike tire. Other tires, in particular mountain bike tires or tires for a bicycle having an electric motor for driving the bicycle, may however also be designed correspondingly. Motorcycle tires, in particular electric scooter tires, can also have the advantageous construction illustrated.

The embodiments of FIG. 1 and FIG. 2 differ in terms of the extent of the first carcass inlay turn-ups 61 and the arrangement of the first carcass inlay ends 7 under the tread 2:

FIG. 1 shows a tire 1 with particularly low rolling resistance. Here, each first carcass inlay end 7 is arranged under the tread 2, in particular as illustrated under a tread runout 22 of the tread, in each case in that axial half 20 of the tire 1 in which the first carcass inlay 6 is guided with the first carcass inlay turn-up 61 over the tire sidewall 3 as far as under the tread 2 to the particular first carcass inlay end 7. In the particular axial half 20 of the tire, the tread runout 22 extends, proceeding from the particular tread end 21, axially inward by at most 10 mm, preferably at most 2 mm, as measured along a radially inner boundary of the tread, to an axially inner tread runout end 23.

The two first carcass inlay turn-ups 61 therefore do not overlap in the crown 17 of the tire 1. The first carcass inlay ends 7 are arranged in each case in the same axial half 20 as that first carcass inlay turn-up 61 which terminates at the particular first carcass inlay end 7. The first carcass inlay turn-ups 61 are thus arranged so as to be limited to the particular axial half 20 of the tire.

FIG. 2 shows a tire 1 with particularly good puncture resistance. By contrast to the tire illustrated in FIG. 1, the two first carcass inlay turn-ups 7 are arranged so as to overlap one another in the crown 17 of the tire 1. Each of the two first carcass inlay turn-ups 61 extends from a bead region 4 in one axial half 20 of the tire as far as under the tread 2 and terminates, in the other axial half 20 of the tire in each case, at the particular first carcass inlay end 7. Thus, in the crown 17 of the tire, the tire 1 is reinforced by four ply thicknesses of the carcass, as illustrated.

FIG. 3 illustrates the dimensioning of the first height 13 and the second height 15. To determine the first height 13 and the second height 15, the two-wheeled vehicle pneumatic tire 1 can, as viewed in cross section, be bent up such that the two carcass inlays 6, 6' extending from the crown 17 are arranged substantially rectilinearly in the region of the sidewall 3 and transition into a loop around the core 5 that is substantially symmetrical with respect to the core 5. This may relate to a detail of the tire of FIG. 1, with the two-wheeled vehicle pneumatic tire 1 being correspondingly bent up as viewed in cross section. In this arrangement, the first height 13 and the second height 15 are measured relative to the outermost turning point 14 of an outer edge of the strength members of the second carcass inlay 6' that are looped around the core 5, and measured parallel to the carcass inlays 6, 6' arranged substantially rectilinearly in the region of the sidewall 3.

Tests

Tests were carried out with four different tube-free racing bike tires. Here, the tires according to the invention R1, designed according to FIG. 1, and R2, designed according to FIG. 2, were tested. A reference tire RR3 substantially structurally identical to the tire R1 was also tested, in which reference tire however, by contrast to the tire R1, the first carcass inlay also terminates with its first carcass inlay ends under the particular bead protective strip. Aside from the carcass structure, the same components were used for the tires R1, R2 and RR3. Furthermore, as a reference tire RR4, a commercially available tubeless racing bike tire having exactly one carcass inlay was tested, wherein the turn-ups of the carcass inlay of the reference tire RR4 are arranged so as to overlap one another in the crown. The reference tire RR4 furthermore has an inner liner for adequate air-tightness. The results are collated in Table 1.

TABLE 1

| Tire | R1 | R2 | RR3 | RR4 |
|---|---|---|---|---|
| Weight [g] | 243 | 263 | 213 | 296 |
| Rolling resistance [W] | 13.4 | 16.3 | 12.6 | 16.2 |
| Number of reinforcing plies in the sidewall | 3 | 3 | 2 | 2 |
| Sidewall cutting resistance [N] | 448 | 446 | 331 | 346 |
| Number of reinforcing plies in the crown | 2 | 4 | 2 | 3 |
| Crown cutting resistance [N] | 725 | 1265 | 775 | 1219 |

The difference in weight of the tires R1, R2 and RR3 is attributable solely to the different lengths of the first carcass inlay. Despite having a single-ply carcass, the tire RR4 is heavier than the other tires owing to the inner liner layer. Accordingly, the weight of the tires increases in the sequence RR3, R1, R2, RR4.

The rolling resistance was measured at a maximum pressure of 7.5 bar and on a 19C rim without a tube or milk sealant. Here, the influence of energy losses resulting from friction between reinforcing plies is evident. The reference tire with the least use of carcass material and the lowest weight also has the lowest rolling resistance. The tire R1 with only one more ply thickness in the sidewall has a somewhat greater rolling resistance. The two tires R2 and RR4 have the greatest rolling resistance, wherein the rolling resistance of the tire R2 is at approximately the same level as the rolling resistance of the commercially available tubeless tire RR4 with a single carcass ply.

The cutting resistance was measured by way of force measurements taken when puncturing the crown of the tire, and the sidewall, using a blade (similar to stones on the roadway). In the blade measurements, the number of reinforcing plies is of major significance. Correspondingly, the cutting resistance in the region of the sidewall of the two tires R1 and R2 is increased by approximately 30% in relation to the cutting resistance of the reference tires RR3 and RR4. In the crown, the greatest cutting resistance is achieved by the tire R2, which is reinforced in the crown by four ply thicknesses. The reference tire RR4 has a somewhat lower cutting resistance in the crown. The tires R1 and RR3, which are reinforced by only two plies in the crown, have the lowest cutting resistance in the crown.

It is thus evident that the tires R1 and R2 according to the invention resolve the conflict of aims between puncture resistance of the sidewall and rolling resistance to a high degree, in favor of the puncture resistance of the sidewall. Even the tire R2 with the greatest puncture resistance in the sidewall and in the crown has only a rolling resistance at the level of that of the reference tire RR4.

LIST OF REFERENCE SIGNS

Part of the Description

1 Two-wheeled vehicle pneumatic tire
2 Tread
3 Sidewall
4 Bead region
5 Core
6 First carcass inlay
6' Second carcass inlay
7 First carcass inlay end
7' Second carcass inlay end
8 Bead protective strip
9 Rubber inlay
10 Tire interior
11 Tire exterior
12 Radially outer end of the bead protective strip
13 First height
14 Outermost turning point
15 Second height
16 Inner end
17 Crown
18 First straight line
19 Second straight line
20 Axial half
21 Tread end
22 Tread runout
23 End of the tread runout
rR Radial direction
aR Axial direction
U Direction of rotation

The invention claimed is:

1. A tubeless or tubeless-ready two-wheeled vehicle pneumatic tire, comprising:
a tread positioned proximate a top portion of the tire,
a tire carcass comprising an outer carcass inlay and an inner carcass inlay,
tire sidewall regions on sides of the tire constructed with side portions of the tire carcass,
two bead regions positioned below respective bases of the tire sidewall regions, each of the two bead regions having a tire bead with a core,
the outer carcass inlay is outward of the inner carcass inlay in a crown region under the tread, and the inner carcass inlay is in direct contact with an interior space of the tubeless or tubeless-ready tire, each of the inner and outer carcass inlays comprising individual strength members running parallel to one another, the strength members of each carcass inlay arranged to enclose an angle of 40 degrees to 60 degrees with respect to a direction of rotation, and the strength members of the inner and outer carcass inlays having an opposite pitch angle,
wherein the inner carcass inlay extends from the crown region, downwardly through the tire sidewall regions into the two bead regions, loops outwardly around the respective cores, and terminates at respective inner carcass inlay ends that terminate in the bead region at a height of at most 13 mm as measured relative to an outermost turning point of the strength members of the inner carcass inlay that are looped around the respective cores,
wherein the outer carcass inlay extends from the crown region, downwardly through the tire sidewall regions into the two bead regions, loops outwardly around the respective cores, extends upwardly back through the respective tire sidewall regions, and terminates at respective outer carcass inlay ends that terminate under the tread,
the tire further comprising bead protective strips arranged on the carcass to cover the inner carcass inlay ends on both sides of the tire, each of the bead protective strips extending to cover a portion of the respective bead region, wherein each of the bead protective strips is formed from a rubberized monofilament fabric that is free of intertwined fibers and microchannels, and the arrangement and structure of the bead protective strips promotes airtightness along with the inner and outer carcass inlays;
wherein the carcass, in the respective tire sidewall regions between (i) the respective radially outer ends of the bead protective strips and (ii) the tread, has only three carcass inlay plies with strength members, with one of the three carcass inlay plies being only one ply of the inner carcass inlay and the other of the three carcass inlay plies being only two plies of the outer carcass inlay.

2. The two-wheeled vehicle pneumatic tire according to claim 1, wherein the tubeless or tubeless-ready tire is a bicycle tire, a racing bike tire, a mountain bike tire, a clincher bike tire, or a tire for a bicycle comprising an electric motor for driving the bicycle.

3. The two-wheeled vehicle pneumatic tire according to claim 1, wherein the outer carcass inlay ends extend under the tread to overlap through the crown region under the tread and terminate in spaced relation from the crown region and spaced from each other under the tread,
wherein the carcass, in the crown region under the tread, has only four carcass inlay plies with strength members, with one of the four carcass inlay plies being only one ply of the inner carcass inlay and a remainder of the four carcass inlay plies being only three plies of the outer carcass inlay.

4. The two-wheeled vehicle pneumatic tire according to claim 1, wherein the outer carcass inlay ends extend under the tread to terminate in a non-overlapping arrangement in which the outer carcass inlay ends are in spaced relation from the crown region and spaced from each other under the tread,
wherein the carcass, in the crown region under the tread, has only two carcass inlay plies with strength members, with one of the two carcass inlay plies being only one ply of the inner carcass inlay and the other of the carcass inlay plies being only one ply of the outer carcass inlay.

5. The two-wheeled vehicle pneumatic tire according to claim 1, wherein each bead protective strip terminates at its radially outer end at a height of at most 15 mm, as measured relative to an outermost turning point of the strength members of the inner carcass inlay that are looped around the respective core.

6. The two-wheeled vehicle pneumatic tire according to claim 5, wherein the bead protective strip terminates at its radially outer end at the height of at most 10 mm to 12 mm as measured relative to an outermost turning point of the strength members of the inner carcass inlay that are looped around the respective cores, and wherein the respective inner carcass inlay ends terminate at the height of 8 mm to 10 mm, as measured relative to the outermost turning point of the reinforcement members of the inner carcass inlay that are looped around the respective cores.

7. The two-wheeled vehicle pneumatic tire according to claim 1, wherein a damping rubber inlay formed from a highly elastic rubber having a material rebound value between 70 and 80 is arranged between the tread and the tire carcass.

8. The two-wheeled vehicle pneumatic tire according to claim 7, wherein the damping rubber inlay has a material thickness between 0.2 mm and 1 mm.

9. The two-wheeled vehicle pneumatic tire according to claim 7, wherein the damping rubber inlay is the only additional inlay between the tire carcass and the tread.

\* \* \* \* \*